United States Patent
Graves et al.

(10) Patent No.: US 7,242,411 B2
(45) Date of Patent: *Jul. 10, 2007

(54) ADJUSTMENT OF COLOR VALUES FOR OPTIMIZED IMAGE PROCESSING

(75) Inventors: Eric Graves, Mountain View, CA (US); Randy Ubillos, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 10/791,308

(22) Filed: Mar. 2, 2004

(65) Prior Publication Data

US 2004/0247186 A1    Dec. 9, 2004

Related U.S. Application Data

(63) Continuation of application No. 09/775,719, filed on Feb. 1, 2001, now Pat. No. 6,707,459.

(51) Int. Cl.
*G09G 5/00* (2006.01)

(52) U.S. Cl. .................................................. 345/603

(58) Field of Classification Search ........ 345/591–593, 345/600, 603, 604, 618, 590; 382/162, 166, 382/232, 233; 348/33, 34
See application file for complete search history.

(56) References Cited

U.S. PATENT DOCUMENTS

| | | | | | |
|---|---|---|---|---|---|
| 6,147,772 | A | * | 11/2000 | Pritchett | 358/1.9 |
| 6,356,276 | B1 | * | 3/2002 | Acharya | 345/600 |
| 6,424,342 | B1 | * | 7/2002 | Perlman et al. | 345/418 |
| 2001/0014175 | A1 | * | 8/2001 | Tavor | 382/167 |

OTHER PUBLICATIONS

Applicant's reference to Apple computer's QuickTime.*

* cited by examiner

*Primary Examiner*—Matthew C. Bella
*Assistant Examiner*—G. F. Cunningham
(74) *Attorney, Agent, or Firm*—Adeli Law Group

(57) ABSTRACT

A method for processing an image of a given file type is disclosed. The method involves converting the image into data formatted for a new pixel type, the new pixel type is closely correlated with and has all the components of pixels for the given file type. In addition, the method includes processing the data formatted in the new pixel type using standard image processing routines, these standard routines being designed for data having different components of pixels than the new pixel type and the given file type.

21 Claims, 6 Drawing Sheets

ADJUSTMENT OF COLOR VALUES FOR OPTIMIZED IMAGE PROCESSING

CROSS REFERENCE TO RELATED APPLICATIONS

This patent application claims benefit to and is a continuation of the United States patent application entitled "Adjustment of Color Values for Optimized Image Processing," having Ser. No. 09/775,719 filed on Feb. 1, 2001 now U.S. Pat. No. 6,707,459.

BACKGROUND

1. Field of the Invention

The invention relates to image processing. More specifically, the invention relates to the color space conversion.

2. Description of Related Art

Many digital video storage formats store pixel data in a color space known as YCrCb or YUV. In the YCrCb format, each pixel in an image is composed of three components, 'Y', 'Cr' and 'Cb'. The 'Y' component contains luminance (intensity) information while the 'Cr' and 'Cb' components contain chrominance (color) information. The YCrCb format is most commonly found used in digital imaging devices such as DV (Digital Video) camcorders. Such devices produce images as an array of pixels each in YCrCb format. However, when interfacing such devices with computer display systems or other video rendering systems, a process known as color space conversion must be performed, since rendering in such systems often occurs with image pixels being in RGB (Red, Green and Blue) format. In RGB format, each pixel is represented as a combination of the three component colors Red, Green and Blue. This situation is illustrated in FIG. 1. Image information captured by a video capture device 110 is stored in YCrCb format and output to a computer system 120 as YCrCb data. In order for computer system 120 to render images to an output/display 130, it must send it RGB data. Hence, the computer system 120 is charged with the task of performing YCrCb to RGB color space conversion on images prior to rendering them on output/display 130.

Color space conversion of image information stored in YCrCb format to RGB format can be achieved by applying a conversion matrix to the components of the pixels. For instance, in one such conversion, a linear combination with specified coefficients for Y, Cr and Cb components of a pixel would yield a corresponding Red value for that pixel. Likewise, another linear combination, with another set of specified coefficients applied to the Y, Cr and Cb components for the same pixel would yield a Blue component value for that pixel. Yet another linear combination would yield the Green component. In a like manner, when converting from RGB back to YCrCb space, a three by three matrix can be applied to the R, G and B components of a given pixel to arrive at the Y, Cr and Cb components for the same pixel. Such conversions are repeatedly performed for all pixels of an image, and may be performed in any convenient order or manner.

If enough precision is used in storing values for color space components and also in the conversion computation, then a fairly problem-free result can be expected. However, in most real world applications and device environments, each component (or "channel") is only accorded eight (8) bits when being stored with very little "headroom" (value ranges that can be used as precision overflows or underflows which do not represent meaningful image information). This fact leads to three common problems that occur due to color space conversion, namely "Chroma Clamping", "Luma Clamping" and loss due to insufficient precision.

The range of values used for YCrCb data and for RGB data further exacerbates these problems. Y components range from +16 to +235. Cr/Cb components range from −112 to +112, offset by 128, for an effective range of +16 to +240. By contrast, R, G and B components all have ranges of 0 to +255. When computer system 120 receives YCrCb data from the video device 110, it is often in a compressed form. Such compression may include standards such as DV (Digital Video), Motion JPEG (Joint Photographic Expert Group), MPEG (Moving Picture Expert Group) and so on. Thus, it must be first be decompressed by the computer system 120. If converted to RGB space for the purpose of running image processing routines on the image data, then after the routines are run, the post-processed image data must often again be converted back into YCrCb space and then recompressed in order to be stored in the same format (such as DV etc.) in which it originated.

Chroma Clamping: Since color spaces are so different in nature, there may often be colors in eight-bit YCrCb that cannot be accurately described in RGB and vice versa. Those colors that fall outside the other color space's range will be clipped to the nearest value which is in range during the conversion. This can cause very saturated colors to become less saturated or intense. For instance, there are many YCrCb color values that map to RGB values greater than 255 or less than 0. For example, a highly saturated color having Y=155, Cb=174 and Cr=220, would probably be mapped (if typical conversion matrices were used) to RGB values of R=255, G=69 and B=255. When mapping back into YCrCb, the result would be Y=141, Cb=182 and Cr=196, which is a shift of color and reduction in brightness from the original. This is the Chroma Clamping phenomenon.

Luma Clamping: Many YCrCb to RGB conversion routines are configured to the maximum range in the target space based upon allowed values in the source space. YCrCb defines for video use a range of 16–235 for Y which is then mapped to a range of 0–255 in the RGB space, giving maximum dynamic range. Unfortunately however, many digital video devices produce Y values far above the restricted range, even as high as Y=254. When such values are converted to RGB, they cannot exceed 255, and so are clamped there. When the RGB is converted back to YCrCb, the Y value will attain its maximum of 235, but this is still much lower than the original value of 254. This causes a difference in what is viewed, particularly in that the luminosity is not fully available. This is the Luma Clamping Phenomenon.

While some color space conversion routines that do map the full range of Y into the full range of RGB do not suffer Luma Clamping, as discussed below, they may suffer even more loss due to precision errors. These losses are greater because the YCrCb values outside the industry-standard recommended ranges have to still be mapped into the industry-standard recommended range for RGB, as are those mapped by all other routines.

Precision Loss: When performing a color space conversion from YCrCb to RGB, three linear combination of the three 8-bit YCrCb components yields the three R, G, and B converted components. When converting these back to YCrCb, yet another set of three linear combinations is applied to achieve the recovered YCrCb components. The inverse linear combinations do not necessarily map the converted R, G and B values back to the original Y, Cr, and Cb values due to the eight bit limitation and due to inherent lack of inverse symmetry in the linear combinations. In other words, YCrCb→RGB→Y'Cr'Cb', where Y, Cr and Cb, do not necessarily equal Y', Cr' and Cb', respectively.

There is needed a method and apparatus for adjusting color values during color space conversion so that Luma Clamping, Chroma Clamping and loss due to precision can be avoided.

SUMMARY OF THE INVENTION

In various embodiments of the invention, a method for processing an image of a given file type is disclosed. The method involves converting the image into data formatted for a new pixel type, the new pixel type is closely correlated with and has all the components of pixels for the given file type. In addition, the method includes processing the data formatted in the new pixel type using standard image processing routines, these standard routines being designed for data having different components of pixels than the new pixel type and the given file type.

In one embodiment of the invention, the new pixel type has the channel order Alpha, followed by Y, followed by Cb, finally followed by Cr. Also, in the new pixel type, the Alpha channel is extended to range from 0 to 255, and the Y channel is modified such that black corresponds to a Y channel value of zero.

DETAILED DESCRIPTION OF THE INVENTION

The disclosure of United States Patent Application entitled "Adjustment of Color Values for Optimized Image Processing," having Ser. No. 09/775,719 filed on Feb. 1, 2001, is expressly incorporated herein by reference.

In various embodiments, the invention enhances image processing routines that work directly in the YCrCb space rather than RGB space. This avoids having to first convert data from YCrCb space to RGB space and allows such color space conversion to be performed at a later stage in the imaging process or even avoided entirely. The invention involves primarily adjusting color values thereby defining a new type of pixel which is convenient for image rendering, but does not affect the file format of image data, which is kept standardized.

Figure 1:
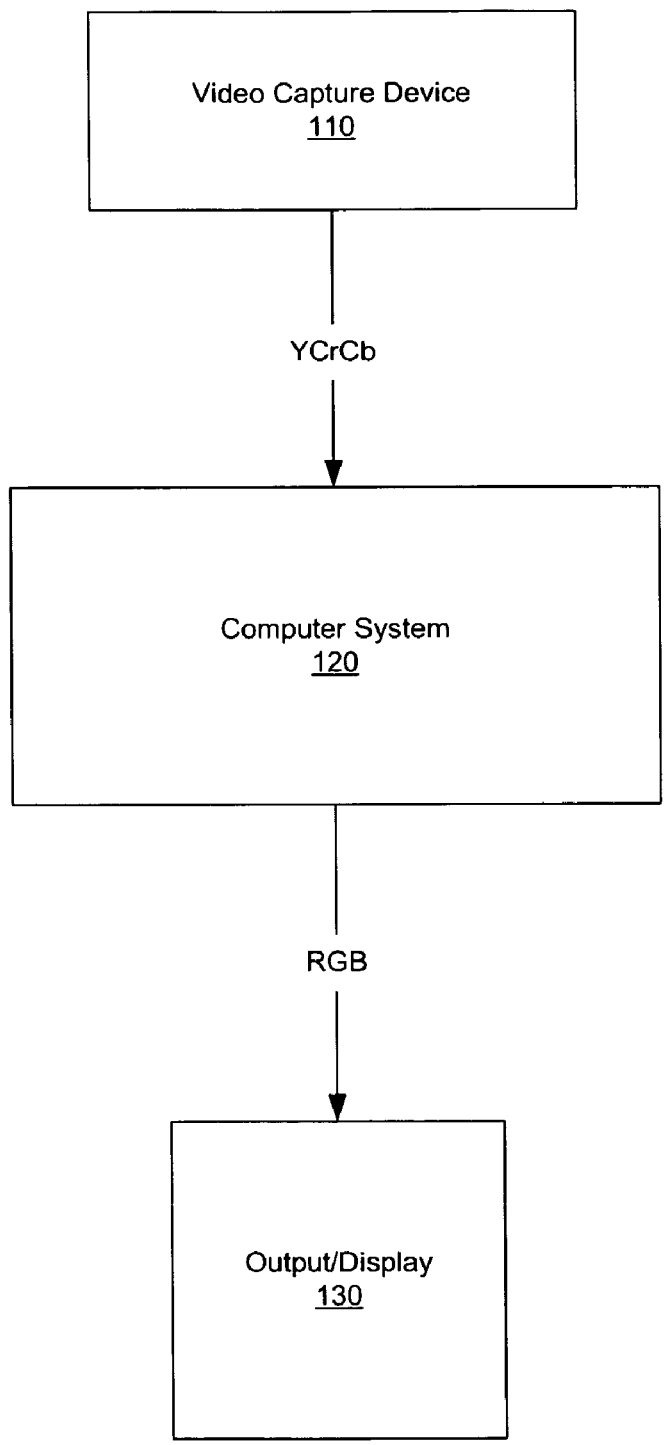
FIG. 1 illustrates a typical imaging system.
Figure 2:
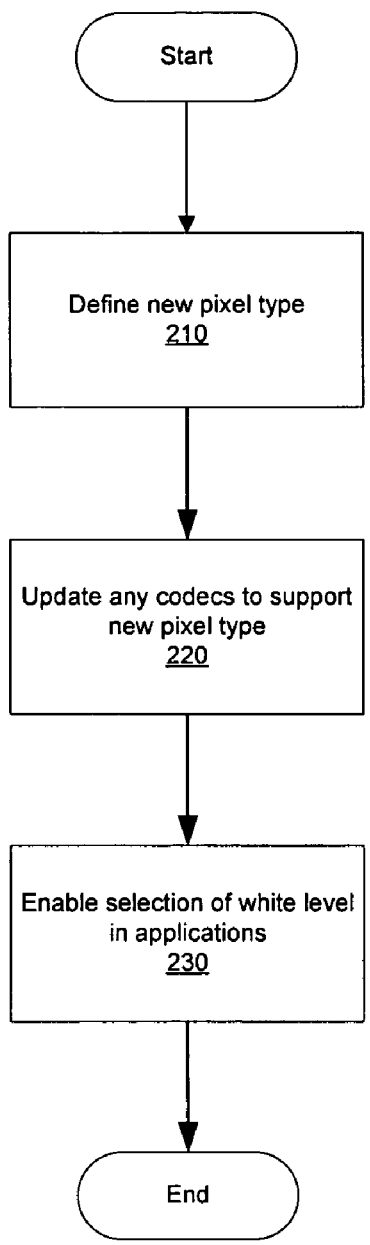
FIG. 2 is a flowchart of enhancing image processing systems according to at least one embodiment of the invention.

FIG. 2 is a flowchart of enhancing image processing systems according to at least one embodiment of the invention. According to block 210, a new type of pixel is defined. The new pixel type is not used in storing the image but can be used in running image processing routines that are natively designed for YCrCb image data. Such routines can operate directly upon digital video data that is transmitted in YCrCb from an image capture device such as a digital video camcorder. The defined pixel type also has, in addition to Y, Cr and Cb channels (components), an Alpha channel. The Alpha channel contains transparency information about each pixel, i.e. tells how transparent or how opaque the color is. The new pixel type differs from conventional pixel types in the way the channels are ordered. In addition, component values are adjusted such that Luma Clamping and Chroma Clamping are avoided. Further, as discussed below, the range of the Alpha channel is increased.

In addition to the defining of the new pixel type, which may need to only be done once, according to block 220, any codecs (compression/decompression algorithms) need to be updated to accept the newly defined pixel type. The codecs are algorithms which are used for compressing and then decompressing image data when rendered or processed. The codecs are updated to operate upon and generate image data whose pixels are of the newly defined type. This includes recognizing the channel re-ordered colorspace used for processing and implementing codec/application support for it efficiently. If support for this format is directly implemented in codecs, then a very efficient operation of the invention is possible, given the similarity in buffer layouts.

In order to better alleviate the phenomenon of Luma Clamping, the invention enables selection of levels of pure luminosity ("white" levels) in image rendering applications (block 230). A user interface could be presented by applications to users allowing them to select the desired white level. In so doing, the mapping of R=255, G=255 and B=255 can be deterministically mapped to either industry-standard recommended pure white or a brighter super-white, which goes above the normal Y range. Such industry standard recommendations have been made by the ITU (International Telecommunications Union) and are well-known in the art. With these three enhancements (blocks 210, 220 and 230) in place, many of the effects of Luma and Chroma clamping can be avoided.

Figure 3:
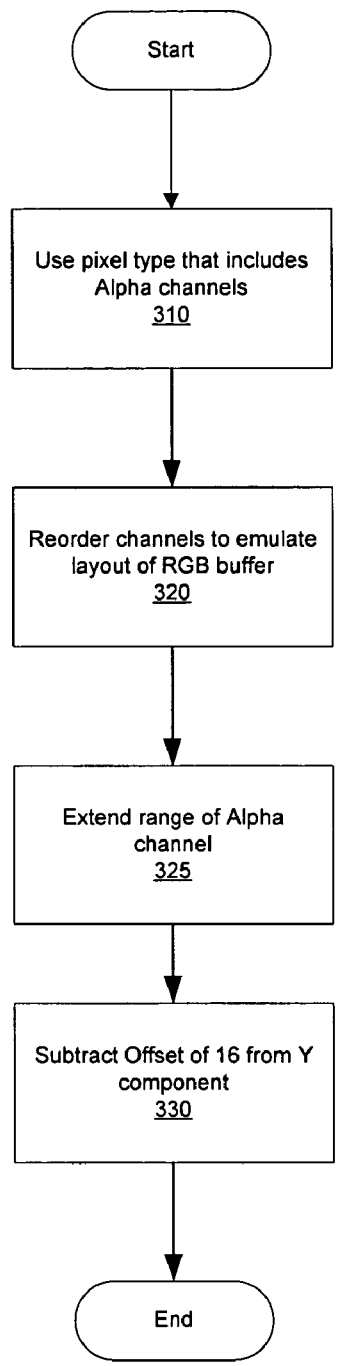
FIG. 3 is a flowchart of adjusting color values for image processing according to at least one embodiment of the invention.

FIG. 3 is a flowchart of adjusting color values for image processing according to at least one embodiment of the invention. According to block 310, a pixel type is chosen that includes the Alpha channel. One such pixel type, defined as v408 (in Apple Computer's QuickTime 4.1.1 and later) (QuickTime is a registered trademark of Apple Computer, Inc.), which has Alpha, Y, Cr and Cb channels, is used in the various embodiments of the invention but is enhanced in a number of ways. The v408 pixel type has a particular channel order which has been defined to take advantage of certain common computing architectures. The ordering of channels in v408 pixels is CbYCrA, which due to byte swapping considerations, works effectively in certain environments. However, it does not correlate well with RGB image buffers, which often have the Alpha channel first. Therefore, the channels are reordered to emulate an RGB buffer when defining the new pixel type according to the invention (block 320). This allows many non-color specific image processing algorithms, such as pixel sampling, to run without alteration and directly on YCrCb image data without having to first convert the image data to RGB. This is detailed in FIGS. 4A through 4C and further described below.

In addition to reordering the channels, the range of the Alpha channel is extended (block 325). In the conventional v408 pixels, the Alpha channel is only assigned a range between 16 and 235, which corresponds to the range of Y channel values. In v408 pixels, the maximum Alpha of 235 corresponds to "white" in the Y channel while the minimum Alpha of 16 corresponds to "black" in the Y channel. Since "black" is not a level of zero (0) and the Alpha values are not in the range of 0–255, this is inconvenient for image processing. Thus, in accordance with various embodiments of the invention, the range of the Alpha channel is extended to range from 0 to 255, with a value of zero (0) indicating transparent and a value of 255 indicating opaque. When decompressing image data into the newly defined pixels having the extended Alpha range, codecs usually fill in the Alpha channel and thus, should be updated to fill in a value of 255 if no specific value is available. This can be achieved when codecs are updated to be able to operate upon the new types of pixels (see block 220 of FIG. 2).

After defining the new pixel type, any mappings of v408 pixels into pixels in the newly defined color space of the invention would also include a color value adjustment. This color value adjustment is achieved by subtracting an offset of 16 from the Y component of each v408 pixel (block 330). Thus, a Y value of 16 in a v408 pixel would map to a Y value of 0 in the newly defined pixel format. This allows black to correlate exactly to a Y value of zero (0). Subtracting the offset of 16 from the maximum Y component value of 235 in v408 gives a value of 219 as a maximum for the newly defined pixel. When converting a "hot" value of Y, say Y=254, the resulting value will be, for example, 238. Since 238 is well within the allocated eight bits, it is not subjected to Luma Clamping. Though the value is out of the recommended range originally, often these "hot" out-of-range values are expected to be maintained even after a processing/rendering operation. After image processing is performed and the image data needs to be re-compressed into v408 (for file storage), the offset of 16 can be added back to the Y component.

Figure 4A:
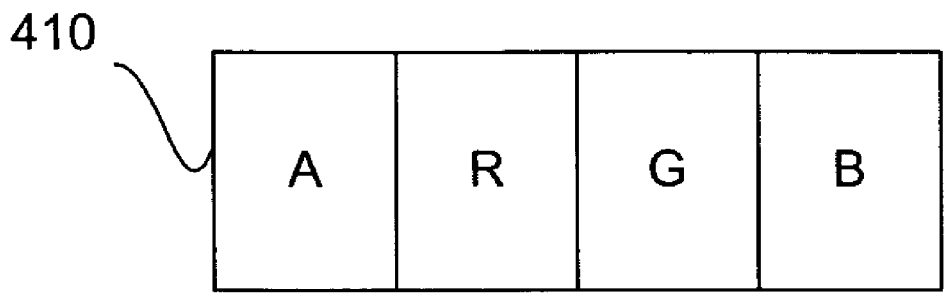
FIGS. 4A–4C illustrate channel re-ordering according to at least one embodiment of the invention.
Figure 4B:
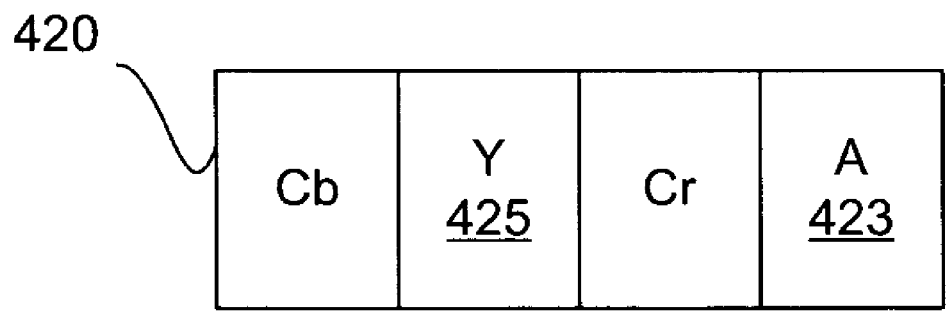
Figure 4C:
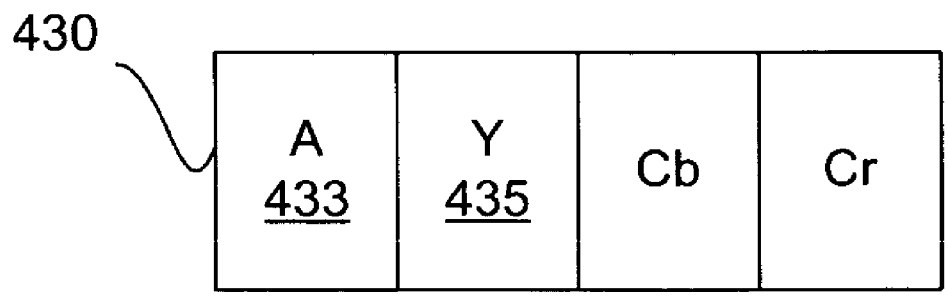

FIGS. 4A through 4C illustrate channel re-ordering according to at least one embodiment of the invention. The order of channels refers to how the bits of the data representing each channel is sequenced, and thus how this data is addressed in memory buffers. Memory buffers are physically available, for example, in video display adapter cards which render image data onto monitors in a computer system. Other image buffers may be artificially created in the memory of a display adapter or as a partition of main memory in a computer system. Typically, these buffers expect pixel data to be of a particular format (such as RGB) and the individual channels arranged in a particular order. For instance, pixel 410, depicted in FIG. 4A is typical of the channel order expected by most image buffers when it receives image data and writes out image data (after image processing). In pixel 410, eight bits (one byte) of Alpha (A) information is followed consecutively by one byte of Red (R) information, one byte of Green (G) information and finally, one byte of Blue (B) information.

YCrCb data, in the v408 pixel format, has its channels ordered as depicted in pixel 420. In pixel 420, the channels are ordered to take advantage of memory addressing features of popular computer architectures. In these systems, data in memory is stored with bytes ordered in reverse over the width of the memory space. Thus, bytes must be "swapped" in order to reassemble data in the correct order. Due to such byte swapping, the v408 pixel, which defines the storage format of YCrCb data, has its channels arranged in a radically different order. As depicted in pixel 420, one byte of Cb information, then one byte of Y information 425, followed by one byte of Cr information and finally, one byte of A (Alpha) information 423.

While the channel ordering of pixel 420 is convenient for certain operations involving certain memory architectures, it is not optimal for others. For image processing operations such as pixel sampling or cropping that do not depend upon the specific color space of the image, the channels of pixel v408 are re-ordered. In the channel re-ordered pixel 430, one byte of A (Alpha) information 433 is followed by one byte of Y information 435, then one byte of Cb information and finally, one byte of Cr information. If the color space difference in the data contained in pixel 410 is ignored, then both pixels 410 and 430 can be considered as being of the same data format. In both pixels 410 and 430, the Alpha channel or transparency information is in the first byte of each pixel, thus leaving the color content of the image in the last three byte locations. The re-ordering of the YCrCb and Alpha channels in pixel 430 allows image processing routines designed for RGB data to run on YCrCb data 1) without altering the routines themselves and 2) without converting the YCrCb color space to RGB color space.

Figure 5:
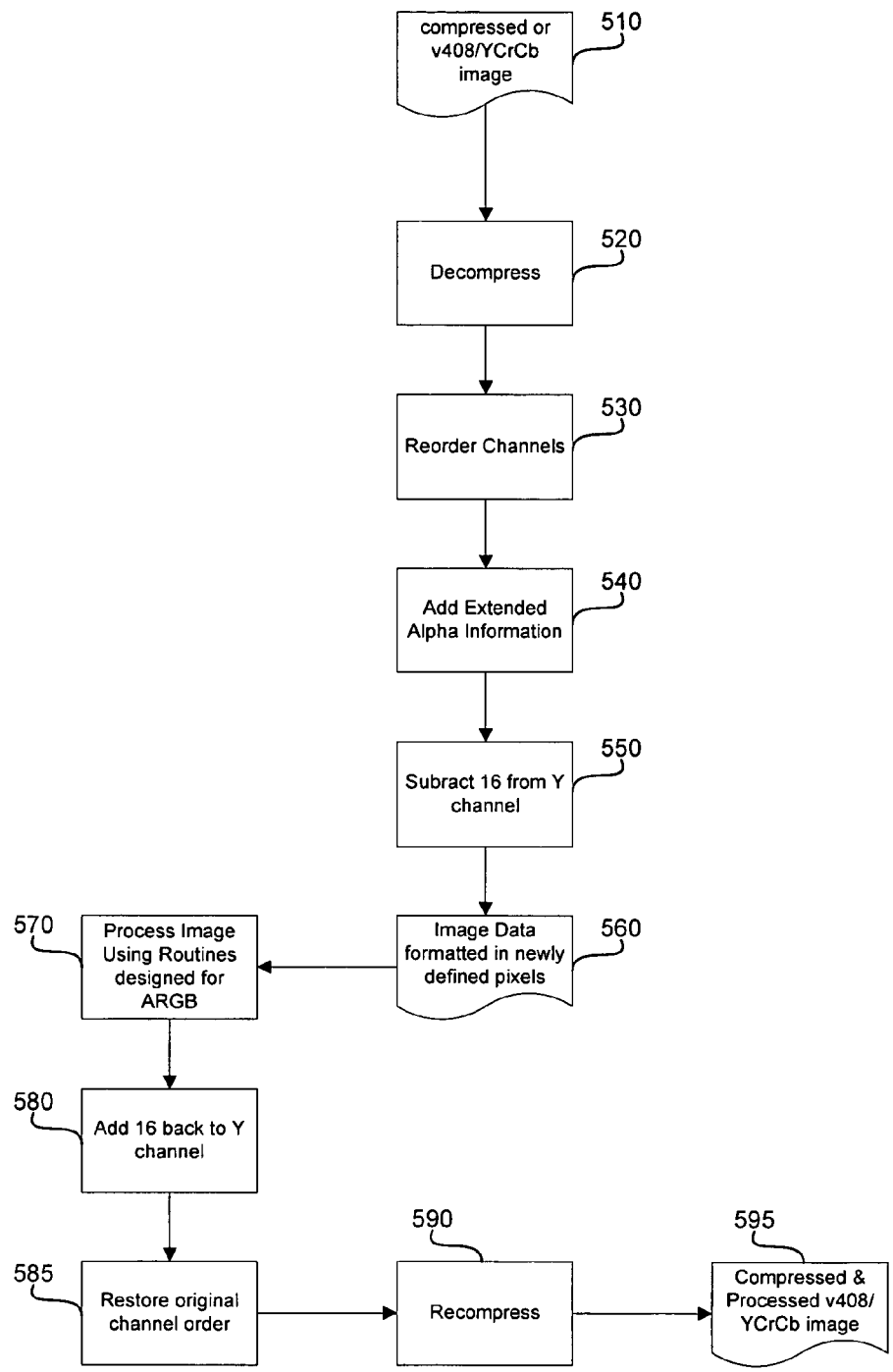
FIG. 5 is a flow diagram illustrating the use of the invention in processing an image.

FIG. 5 is a flow diagram illustrating the use of the invention in processing an image. As described above, v408 is a Alpha and YCrCb format for pixels of an image which is employed in storing images in files or when transferring them to a computer storage mechanism. There are numerous other YCrCb formats, such as those that are "sub-sampled". For instance, in one sub-sampled format, there is a block of four pixels that have an independent Y component for each pixel in the block and only one Cr and one Cb component that is repeated over the pixel block. Regardless the format of the pixels that form a given image, the stored version of these is usually in a compressed form.

A compressed v408/YCrCb image 510 must first be decompressed (block 520) if any format native image processing can be achieved. The decompressed data from compressed image 510 will contain Y, Cr and Cb components and may have been sub-sampled (where only one Cr and Cb component is used for more than one different Y component). In any case, the decompress module 520 will generate a Y, Cr and Cb component for each pixel location and if Alpha information is included in compressed image 510 (for instance if image 510 has pixels in the v408 format), an Alpha component as well. If no Alpha component is extractable from the compressed image 510, it can be filled in with a default value elsewhere in the process (see block 540).

All of the recovered Y, Cr, and Cb (and Alpha, if available) components represent Y, Cr, and Cb (and Alpha, if available) channels, respectively. The order in which these channels appear in the recovered data (from decompress 520) depends primarily upon the original format of the data in image 510. Re-order channels 530 will cause the recovered, decompressed pixel values to have the channel order of Alpha, Y, Cb, followed finally by Cr. For instance, if the data in image 510 prior to compression was in the channel order for v408, then, in accordance with the invention, the channels will be re-ordered (block 530). In that case, if v408 formatted data were recovered from decompress 520, then re-order channels 530 could operate as follows to achieve the desired channel order:

1) first, the first and second bytes (channels) would be swapped, giving the order Y, Cb, Cr and then Alpha; and 2) a circular shift in the rightward direction of one byte (channel) causing the Alpha channel to appear as the first channel followed by Y, Cb and Cr channels. Alternatively, some platforms have a general "permute engine" reorder bytes in one step without having to perform the above operations.

After the channels are re-ordered, extended Alpha information is added (block 540). In accordance with the invention, the Alpha channel's range is extended such that a value of zero (0) represents transparent while a value of 255 represents opaque. If Alpha channel information is not attainable from the decompressed data (from block 520), then a predefined value, such as 255, indicating maximum opaqueness of the pixel, is filled in for the Alpha channel. If Alpha information is already present but not of full range, it can be extended using linear scaling. The re-ordering of channels (block 530) and the extending/filling of Alpha channel information can be concurrently performed together or in any sequence applicable to the implementation.

To map the values of the recovered Y channel into Y values suitable for the image space defined by the invention, a value of 16 is subtracted from the Y channel (block 550). Ordinarily, in accordance with industry standards, the stored Y channel (and thus, the recovered Y channel data) has values that range from 16 to 235. After subtracting 16 from the Y channel, the new range of Y channel values will be 0 to 219. This allows "black" to correspond to zero in both RGB and the new color spaces. Additionally, by placing black at zero, computation is made less burdensome than when dealing with black at a value of 16. Also, while the recommended range for most video is a Y value of 235, many values in the "headroom", with Y values of 236 through 254 are recorded on the media. By overexposing, image capture devices sometimes capture and record values of Y in the headroom. By using the newly defined color space, these headroom values can be preserved since 16 is later added on to the top values of Y as well. As a result, no brightness is lost from the original image, and no luma clamping occurs.

Once the range of the Y channel is modified (block 550), and blocks 530–540 have also been performed, then the decompressed data recovered from image 510 is transformed into image data 560 in the newly defined color space. The image data 560 will have a channel order A, Y, Cb and then Cr and Alpha values from 0 to 255 and Y values from 0 to 238 (with industry-standard white at 219). This allows image processing routines designed for the ARGB (Alpha, Red, Green and Blue) color space which do not perform color-specific processing (such as color matching), to run directly on image data 560 (block 570). Two examples of image processing routines which meet these criteria are image blending and image blitting (copying data with a scaling or other transformation applied).

Once the image processing routine(s) have been completed (in accordance with block 570), the processed image data may need to be stored back to a file or transferred to a device. The effect of the mapping into the newly defined image space must essentially be reversed. Therefore, according to block 580, 16 is added back to the Y channel. Thus, a value of 0 would become the industry standard Black value of 16, and a value of standard white of 219 would become the industry-standard white of 235. The headroom available for values between 220 through 239 are also transformed, by adding 16, to 236 through 254. This way, pixels originally brighter than 235 even when transformed from the newly defined space and put back to the original format would retain the same brightness. With the Y channel restored to its industry recommended range of 16 to 235 (with headroom up to 254 for brighter than white values), the channel order also needs to be restored (block 585). Thus, the channels are again re-ordered such they return to the order of Cb, Y, Cr followed by Alpha. the Alpha may need to be inversely scaled if it is extended by linear scaling. Since most compressed and decompressed formats do not store Alpha, this information could simply be ignored.

Once the channel order is restored, the data can be recompressed (block 590) with the original codec used to decompress (block 520). The resulting compressed image 595 will adhere to the same format as image 510, but will have had image processing performed on the data within. While the process described above defines a new color space for certain image processing, it eliminates the need to convert the color space of image 510 to RGB, and thus, avoids the problems of rounding error and clamping. There is no conversion to RGB and thus, no need to convert back to the YCrCb space.

Figure 6:
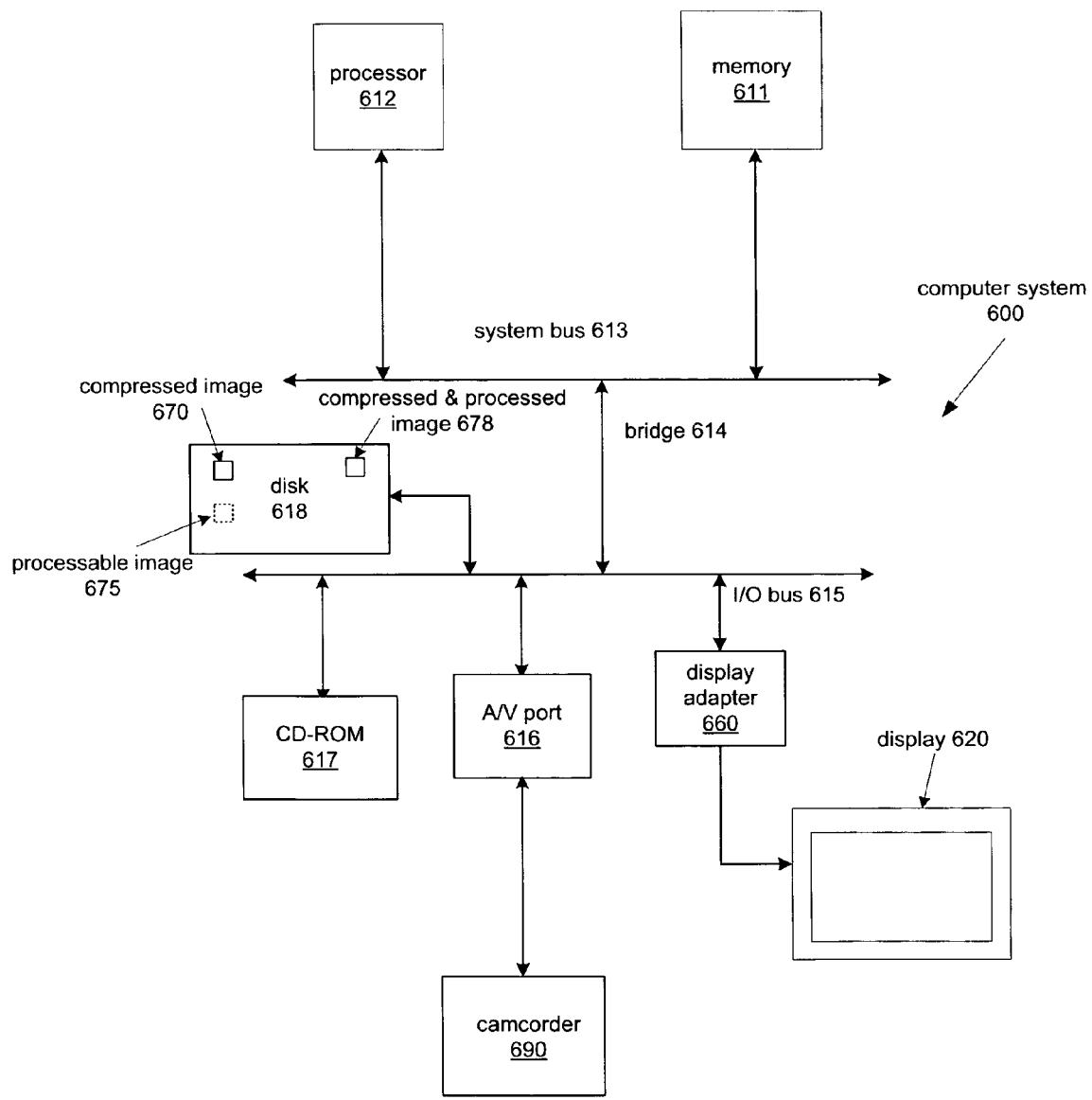
FIG. 6 shows an exemplary computer system capable of implementing various embodiments of the invention.

FIG. 6 shows an exemplary computer system capable of implementing various embodiments of the invention. A computer system 600 may be any of a mobile computer, desktop computer or any general or special purpose information processing device. System 600 features a system bus 613 for allowing core internal components, such as a processor 612 and a memory 611, to communicate with each other. Memory 611 may consist of random access memory (RAM), in any of its varieties or any other temporary or volatile storage mechanism. Memory 611 operates to store instructions to be executed by processor 612. Memory 611 also may be used for storing temporary variables or other intermediate result data during execution of instructions by processor 612.

Computer system 600 also has a bridge 614 which couples to an I/O (Input/Output) bus 615. I/O bus 615 connects to system 600 various peripheral and I/O devices such as a Audio/Video (A/V) port 616, a disk 618 and a CD-ROM (Compact Disc Read-Only Memory) 617. I/O bus 615 also couples to the system a display adapter 660 which is responsible for image processing/rendering functions for computer system 600.

Display adapter 660 may include still image rendering and motion image/video (such as MPEG) processing/rendering capability. Display adapter 660 typically renders still image data in RGB (Red, Green and Blue) format which is compatible with most displays. Display adapter 660 renders its still/motion image data to a display device 620 such as a monitor or LCD (Liquid Crystal Display) screen. Display adapter 660 typically has its own on-board video memory for image processing and rendering in order to speed up processing/rendering and to avoid utilizing memory 611 for such operations.

The A/V port 616 enables the system 600 to connect to A/V devices such as a camcorder 690 and facilitates the exchange of audio and video information between system 600 and camcorder 690. For instance, a video feed or sequence of still images may be fed into system 600 by way of the A/V port 616. In certain instances, the A/V port 616 may have been built into another device/card such as the display adapter 660. The A/V port may provide for the connection of external devices using electro-mechanical connectors such as composite video or stereo audio cables. Disk 618 is a hard disk drive, floppy disk drive or tape drive or other form of non-volatile storage and is used to store data/application files and other more permanent information.

Client 600 has an operating system software (not depicted) that handles the interaction between its devices and software applications. Such software would carry information regarding video codecs, file formats and what applications or devices may be associated with files. Operating system software also governs the manner/mechanism of input/output for users of client 600. Applications, such as a video editing software, are usually built on top of and work in conjunction with the operating system software. Due to its criticality, operating system software is most often permanently stored on disk 618, firmware or other semi-permanent storage. The operating system software typically runs in memory 611 after being loaded upon the start-up of computer system 600. In accordance with the invention, certain codecs that are accessible through the operating system may need to be modified to handle/recognize the newly defined pixel type, which has been described above.

In accordance with one embodiment of the invention, a video device such as camcorder 690 would capture an image or sequence of images in YCrCb format. The YCrCb formatted image data would be sent to computer system 600 via the A/V port 616. The YCrCb formatted image data may either be in a compressed form when sent through the A/V port 616 or may be input to system 600 in a raw format and then compressed by a separate application or by being compressed on display adapter 660. In either case, the compressed image data 670 therefrom is stored onto a non-volatile storage such as disk 618.

Once stored, the compressed image 670 can be manipulated in a number of ways. Conventionally, the compressed image 670 was decompressed and transformed from YCrCb into a color space such as RGB, and then back into YCrCb in order to be stored back onto disk 618 in the original file format. As mentioned earlier, such conversion led to loss of much original image information. The invention, in various embodiments, defines a new pixel format that can be used while such image processing routines are performed, while not converting to an entirely different color space. The pixel format has the following properties:

1) an order of Alpha, Y, Cb and then Cr;
2) a modified Y channel that is 16 less than the original Y; and
3) an extended Alpha channel that ranges from 0 to 255.

Compressed image 670 is in a commonly known image file format having pixels in v408 or similar configuration. In one embodiment of the invention, the data of compressed image 670 is first decompressed and then re-ordered and adapted (by subtracting 16 from the Y channel, and extending/adding Alpha information) until a temporary processable image 675 is generated. Processable image 675 can be stored on disk 618 during the duration of any image processing routine or may even be loaded into memory 611 or memory of the display adapter 660. Processable image 675 has pixels in the format defined by the invention. This format closely matches the Alpha, Red, Green and Blue format and thus allows processable image 675 to run through certain non-color-space specific image processing routines to run unaltered. Once image processing routines are run on processable image 675, the resultant data can be recompressed and placed back into a common format. This may be achieved by adding 16 back to the Y channel and by reordering the channels to fit the original file format of compressed image 670. The resultant data, once transformed back into v408 pixels or whatever the original pixel format, can also be stored onto disk 618 as compressed & processed image 678.

The processable image 675 can be subjected to image processing routines such as pixel sampling, and can be processed by means of display adapter 660 or by an application program or code executing via processor 612 and on memory 611. Such application programs or code to implement the generation of a processable image 675, and to implement updating of codecs, can be written by those of skill in the art in a source language such as C++ and may be compiled and stored as executable(s) on disk 618. As part of an application program or codec updating mechanism, such code may be pre-compiled and stored on a CD loaded by CD-ROM 617 and then loaded into memory or installed onto disk 618. Further, one or more embodiments of invention provide that users select the white and super-white levels (Y channel maximum mappings) of the image. Such selection of white level may be programmed into applications for image editing or in other applications that generate the processable image 675.

We claim:

1. A method comprising:
   defining a new pixel type for the purpose of processing images of a given file type, said given file type having a plurality of channels of image data, wherein defining said new pixel type comprises providing a corresponding channel for each channel of said given file type;
   updating codecs to support handling of images formatted in said new pixel type;
   converting an image stored in said given file type into data formatted in said new pixel type; and
   processing said data formatted in said new pixel type using standard image processing routines, said standard routines designed for a color space different than that of said given file type and said new pixel type.

2. A method according to claim 1 further comprising:
   enabling a user to select white levels and super-white levels in said new pixel type, said super-white levels having a channel value greater than a maximum corresponding channel value of said given file type.

3. A method according to claim 1, wherein said new pixel type is ordered with an Alpha channel first, followed by a Y channel second, followed by a Cb channel third, and a Cr channel fourth, said converting including re-ordering of said data in given file type to match the order of said new pixel type.

4. A method according to claim 1, wherein said defining includes:
   providing at least one channel with an extended range.

5. A method according to claim 1, wherein said defining includes:
   utilizing of a luminance channel such that black corresponds to a luminance value of 0.

6. A method according to claim 4, wherein said channel with the extended range is an Alpha channel, wherein said converting includes:
   if said Alpha channel was present in said given file type, then merely extending the range of said Alpha channel to correspond to the new pixel type definition; and
   if said Alpha channel was not present in said given file type, then filling in Alpha values for the Alpha channel.

7. A method according to claim 1, wherein said converting includes:
   subtracting a fixed offset value from at least one channel of data in said given file type.

8. A method according to claim 1, wherein said defining includes:
   providing at least one channel with an extended range; and
   utilizing of a luminance channel such that black corresponds to a luminance value of 0.

9. A method according to claim 8 wherein said converting includes:
   if said Alpha channel was present in said given file type, then merely extending the range of said Alpha channel to correspond to the new pixel type definition; and
   if said Alpha channel was not present in said given file type, then filling in Alpha values for the Alpha channel; and
   subtracting a fixed offset value from the Y channel of data in said given file type.

10. A method according to claim 1 wherein said given file type has pixels of type v408, and said standard image processing routines are designed for RGB data.

11. A method according to claim 1, wherein said processing is confined to routines that are not color space specific.

12. A method for processing an image of a given file type having a plurality of channels of image data, said method comprising:
   converting said image into data formatted for a new pixel type, said new pixel type defined by a corresponding channel for each channel of said given file type; and
   processing said data formatted in said new pixel type using standard image processing routines, said standard routines designed for a color space different than that of said new pixel type and said given file type.

13. A method according to claim 12 further comprising:
   converting said processed data back into format of said given file type.

14. A method according to claim 13 further comprising:
   decompressing said image prior to said converting if said given file type stores component data in a compressed form.

15. A method according to claim 13 comprising:
   compressing said processed data after said converting back of said processed data into the format of said given file type.

16. A method according to claim 12, wherein said new pixel type includes an Alpha, a Y, a Cr and a Cb channels, said Alpha channel extended in range, said Y channel has a value of Black corresponding to zero, all said channels reordered to correspond closely with said standard routines.

17. A computer readable medium storing a computer program, said computer program comprising sets of instructions for:
   defining a new pixel type for the purpose of processing images of a given file type, said given file type having a plurality of channels of image data, wherein defining said new pixel type comprises providing a corresponding channel for each channel of said given file type;
   updating codecs to support handling of images formatted in said new pixel type;
   converting an image stored in said given file type into data formatted in said new pixel type; and
   processing said data formatted in said new pixel type using standard image processing routines, said standard routines designed for a color space different than that of said given file type and aid new pixel type.

18. A computer readable medium storing a computer program, said computer program comprising sets of instructions for:
   converting said image into data formatted for a new pixel type, said new pixel type defined by a corresponding channel for each channel of said given file type; and
   processing said data formatted in said new pixel type using standard image processing routines, said standard routines designed for a color space different than that of said new pixel type and said given file type.

19. The computer medium of claim 17, wherein said new pixel type includes an Alpha, a Y, a Cr and a Cb channels, said Alpha channel extended in range, said Y channel has a value of Black corresponding to zero, all said channels reordered to correspond closely with said standard routines.

20. An apparatus comprising:
   means for defining a new pixel type for the purpose of processing images of a given file type, said given file type having a plurality of channels of image data, wherein defining said new pixel type comprises providing a corresponding channel for each channel of said given file type;
   means for updating codecs to support handling of images formatted in said new pixel type;
   means for converting an image stored in a said given file type into data formatted in said new pixel type; and
   means for processing said data formatted in said new pixel type using standard image processing routines, said standard routines designed for a color space different than that of said given file type and said new pixel type.

21. An apparatus enabling processing an image of a given file type having a plurality of channels of image data, comprising:
   means for converting said image into data formatted for a new pixel type, said new pixel type defined by a corresponding channel for each channel of said given file type; and
   means for processing said data formatted in said new pixel type using standard image processing routines, said standard routines designed for a color space different than that of said new pixel type and said given file type.

* * * * *